United States Patent

Williams

[11] 4,322,521
[45] Mar. 30, 1982

[54] PROCESS FOR PRODUCING HALOGENATED AROMATIC POLYESTERS

[75] Inventor: Albert G. Williams, West Orange, N.J.

[73] Assignee: Celanese Corporation, New York, N.Y.

[21] Appl. No.: 208,366

[22] Filed: Nov. 19, 1980

[51] Int. Cl.$^3$ .................... C08G 63/68; C08G 63/70
[52] U.S. Cl. ................................. 528/182; 528/191; 528/483
[58] Field of Search .............. 528/179, 182, 191, 194, 528/483, 490

[56] References Cited

U.S. PATENT DOCUMENTS

| | | | |
|---|---|---|---|
| 3,133,898 | 5/1964 | Keck | 528/191 |
| 3,234,167 | 2/1966 | Sweeny | 528/191 |
| 3,234,168 | 2/1966 | Hare | 528/182 |
| 3,704,279 | 11/1972 | Ismail | 528/191 |
| 3,766,140 | 10/1973 | Ismail | 528/191 |
| 3,883,467 | 5/1975 | Stackman et al. | 528/191 |
| 4,066,623 | 1/1978 | Besso et al. | 528/191 |
| 4,132,705 | 1/1979 | Stackman et al. | 528/191 |

*Primary Examiner*—Lester L. Lee
*Attorney, Agent, or Firm*—Charles B. Barris

[57] ABSTRACT

Halogenated aromatic polyesters having the recurring structural formula

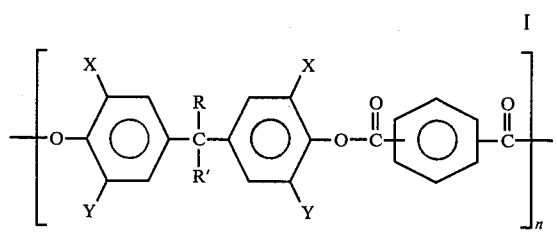

wherein X is chlorine or bromine and Y is hydrogen, chlorine or bromine, with the provision that when X is chlorine, Y is hydrogen or chlorine and when X is bromine, Y is hydrogen or bromine, R and R' may be the same or different and represent lower alkyl groups, hydrogen, or together constitute a cyclic hydrocarbon group, and n is an integer which is at least about 10, are prepared by (a) reacting in solution in the presence of an excess amount of a tertiary amine
  (1) a bisphenol having the structural formula

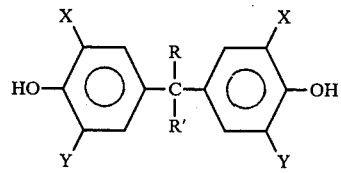

wherein X, Y, R and R' have the same meanings as given above; with
  (2) an aromatic acid halide selected from the group consisting of terephthaloyl halide, isophthaloyl halide, and mixtures thereof to form a reaction mixture comprising solvent, tertiary amine hydrochloride, unreacted tertiary amine, and the halogenated aromatic polyester, (b) adding to the reaction mixture an amount of gaseous, substantially anhydrous, hydrogen chloride sufficient to substantially completely neutralize the unreacted tertiary amine, and (c) recovering the halogenated aromatic polyester.

14 Claims, No Drawings

PROCESS FOR PRODUCING HALOGENATED AROMATIC POLYESTERS

BACKGROUND OF THE INVENTION

Halogenated aromatic polyesters such as the condensation products of 4,4'-isopropylidene-2,2',6,6'-tetrachlorodiphenol or 4,4'-isopropylidene-2,2',6,6'-tetrabromodiphenol with isophthalic acid and/or terephthalic acid or the esterforming derivatives thereof are known and may be prepared, for example, by acid interchange reactions as disclosed, e.g., in U.S. Pat. Nos. 3,948,856 and 3,824,213, both of which are assigned to the assignee of the present invention.

Another method for preparing these halogenated aromatic polyesters in the solution polymerization process as disclosed in U.S. Pat. No. 3,234,167 which is hereby incorporated by reference. This method involves the reaction in solution of the halogenated aromatic alcohol with an excess of an acid acceptor which is typically a tertiary amine such as triethyl amine and then the reaction of the tertiary amine/halogenated aromatic alcohol complex with isophthaloyl halide and/or terephthaloyl halide to produce a reaction mixture comprising solvent, the halogenated aromatic polyester, tertiary amine hydrochloride, and unreacted tertiary amine. The unreacted tertiary amine is then neutralized with aqueous hydrochloric acid to form a two-phase system. See, for example, U.S. Pat. No. 3,864,448, which is assigned to the assignee of the present invention.

Although this neutralization technique is effective in converting substantially all of the tertiary amine into the hydrochloride of the tertiary amine, it suffers from the disadvantages that (1) a substantial excess of hydrochloric acid is required to neutralize all of the tertiary amine if neutralization is to be accomplished in a commercially acceptable period of time, and (2) if a substantially stoichiometric amount of hydrochloric acid is employed (i.e., substantially no excess), then the two-phase system must be in contact for a commercially unacceptable period of time for substantially complete neutralization to take place.

Also, the two-phase prior art method of neutralizing the tertiary amine necessarily dilutes the tertiary amine/hydrochloride complex which is already formed (by the reaction of the isophthaloyl halide and/or terephthaloyl halide with the complex of halogenated aromatic alcohol and tertiary amine) and also dilutes that tertiary amine hydrochloride which is formed during the neutralization reaction. Such dilution is disadvantageous since the tertiary amine hydrochloride must be separated from the solvent and the addition of water in the aqueous hydrochloric acid solution tends to render the water removal process more difficult.

Finally, the two-phase prior art method of neutralizing the tertiary amine generally requires four sequential aqueous hydrochloric acid washes to effect the substantial removal of the tertiary amine hydrochloride. Each neutralization step involves agitation, settling and decantation, followed by three or more water washes to achieve a pH of 6. Furthermore, transfer of the excess tertiary amine to the interface of the two phase system and contact of the tertiary amine with the hydrochloric acid in the aqueous phase all involves significant amounts of time. These time requirements are disadvantageous, especially in a commercial process.

The search has continued for improved processes for producing halogenated aromatic polyesters. This invention was made as a result of that search.

OBJECTS AND SUMMARY OF THE INVENTION

Accordingly, a general object of the present invention is to avoid or substantially alleviate the above problems of the prior art.

Another object of the present invention is to provide a solution process for preparing halogenated aromatic polyesters in the presence of a tertiary amine wherein the tertiary amine may be neutralized without the addition of substantial amounts of water.

Other objects and advantages of the invention will become apparent from the following summary and description of the preferred embodiments of the present invention.

The present invention provides a process for producing a halogenated aromatic polyester. This process comprises (a) reacting in solution in the presence of an excess amount of a tertiary amine
  (1) a bisphenol having the structural formula

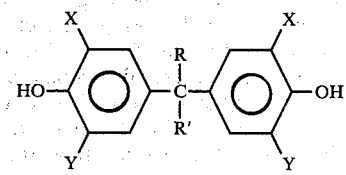

wherein X is chlorine or bromine, and Y is hydrogen, chlorine or bromine, with the provision that when X is chlorine, Y is hydrogen or chlorine and when X is bromine, Y is hydrogen or bromine, R and R' may be the same or different and represent lower alkyl groups, hydrogen, or together constitute a cyclic hydrocarbon group, with
  (2) an aromatic acid halide selected from the group consisting of terephthaloyl halide, isophthaloyl halide, and mixtures thereof to form a reaction mixture comprising solvent, tertiary amine hydrochloride, unreacted tertiary amine, and a halogenated aromatic polyester having the recurring structural formula:

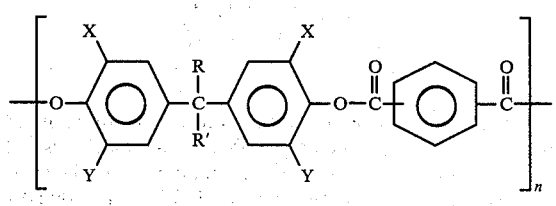

wherein X, Y, R and R' have the same meanings as above and n is an integer which is at least about 10, (b) adding to the reaction mixture an amount of gaseous, substantially anhydrous, hydrogen chloride sufficient to substantially completely neutralize the unreacted tertiary amine, and (c) recovering the halogenated aromatic polyester.

DESCRIPTION OF THE PREFERRED EMBODIMENTS

Halogenated aromatic polyesters prepared in accordance with the process of this invention have recurring units of the structural formula:

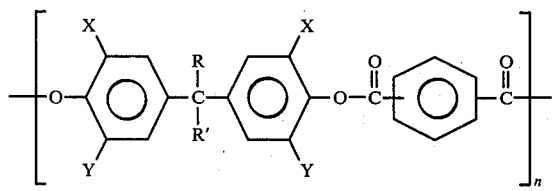

wherein X, which may be the same or different, may be chlorine or bromine, Y, which may be the same or different, may be hydrogen, chlorine, or bromine, R and R' may be the same or different and represent lower alkyl groups (e.g., having from 1 to about 5 carbon atoms), hydrogen, or together constitute a cyclic hydrocarbon group, and n equals at least 10 (e.g., n equals about 40 to 400, typically about 50). Commonly the aromatic polyester utilized in accordance with the process of this invention has a chlorine and/or bromine content of about 15% to 60% by weight based upon the weight of the aromatic polyester (e.g., a chlorine and/or bromine content of about 25% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula are prepared by reacting substantially equimolar amounts of (1) an appropriate bisphenol, and (2) a diacid halide such as isophthaloyl chloride, terephthaloyl chloride, or mixtures thereof by solution polymerization.

Initially the appropriate bisphenol is dissolved in a suitable solvent. A catalyst or acid acceptor is also dissolved in the solvent prior to the addition of the diacid halide.

The bisphenols which are useful in the preparation of the polyesters having recurring units of the formula illustrated above have the structure:

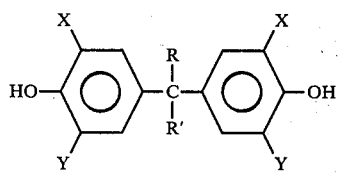

where X, Y, R and R' have the same significance as set forth hereinabove. Suitable bisphenols which are useful in the practice of this invention include bis(3,5-dibromo-4-hydroxyphenyl)methane; bis(3,5-dichloro-4-hydroxyphenyl)methane; bis(3-chloro-5-bromo-4-hydroxyphenyl)methane; 1,1-bis(3,5-dibromo-4-hydroxyphenyl)ethane; 1,1-bis(3,5-dichloro-4-hydroxyphenyl)ethane; 1,1-bis-(3-chloro-5-bromo-4-hydroxyphenyl)ethane; 1,1-bis-(3,5-dibromo-4-hydroxyphenyl)propane; 1,1-bis-(3,5-dichloro-4-hydroxyphenyl)propane; 1,1-bis-(3-chloro-5-bromo-4-hydroxyphenyl)propane; 2,2-bis-(3,5-dibromo-4-hydroxyphenyl)propane; 2,2-bis-(3,5-dichloro-4-hydroxyphenyl)propane; 2,2-bis-(3-chloro-5-bromo-4-hydroxyphenyl)-propane; bis-(3-bromo-4-hydroxyphenyl)methane; bis-(3-chloro-4-hydroxyphenyl)methane; 3-bromo-3'-chloro-bis(4-hydroxyphenyl)-methane; 1,1-bis-(3-bromo-4-hydroxyphenyl)ethane; 1,1-bis-(3-chloro-4-hydroxylphenyl)ethane; 3-bromo-3'-chloro-bis-(4,4'-hydroxyphenyl)ethane; 1,1'-bis-(3-bromo-4-hydroxyphenyl)propane; 1,1'-bis(3-chloro-4-hydroxyphenyl)propane; 1,1'-(3-chloro-3'-bromo-bis-[4,4'-hydroxyphenyl])propane; 2,2'-bis(3-bromo-4-hydroxyphenyl)propane; 2,2'-bis-(3-chloro-4-hydroxyphenyl)propane; 2,2'-(3-bromo-3'-chloro-bis[4,4'-hydroxyphenyl])propane; as well as their alkali metal salts.

Preferred bisphenols are 2,2-bis-(3,5-dibromo-4-hydroxyphenyl)propane, also known as tetrabromobisphenol A, and 2,2-bis-(3,5-dichloro-4-hydroxyphenyl)-propane, also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

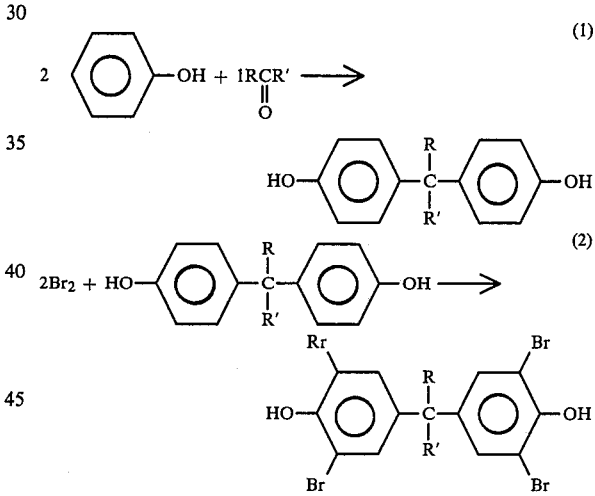

The solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Suitable solvents which may be utilized in the solution polymerization technique described herein include chloroalkanes and aromatic and chloroaromatic compounds. Examples of such compounds include methylene chloride, chloroform, tetrachloroethane, trichloroethane, chlorobenzene, chlorotoluene, dichloroethane, benzene, toluene, and xylene.

The catalyst or acid acceptor is preferably a tertiary amine which is capable of undergoing a reaction with the bisphenol to form a complex salt. The bisphenol complex salt subsequently reacts with the diacid halide and liberates an amine halide.

Stoichiometric amounts of the bisphenol and the catalyst would require a ratio of the tertiary amine to the bisphenol of about 2:1. However, it has been found that in order for the reaction to proceed at a commercially acceptable rate, an excess of acid acceptor should be employed. The amount of excess acid acceptor is generally less than about 50, typically less than about 20, and preferably less than about 5 percent by weight based upon the stoichiometric amount of acid acceptor required. The upper limit of acid acceptor is not critical. However, it should be remembered that excess amounts of acid acceptor must be neutralized and the reaction product of the neutralization reaction must be separated from the final polymer product.

Representative examples of suitable tertiary amine catalysts or acid acceptors include triethylamine, diamino2,2,2,bicyclo octane, tripropyl amine, dimethyl aniline, pyridine, dimethyl amine and benzyl amine. Triethylamine is a preferred acid acceptor.

It will be noted that the halogenated aromatic polyesters of this invention are prepared by the condensation of bisphenols with the diacid halides of isophthalic acid, terephthalic acid or mixtures thereof. The use of a diacid halide as opposed to other corresponding derivatives is important in that it is normally not possible to directly prepare these polymers from bisphenols and free acids. These acid halides may be derived from the corresponding dicarboxylic acids by any one of several methods well known in the art such as by reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical, the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of from about 45 to about 75%, preferably from about 55 to about 65% (e.g., 60%) by weight isophthaloyl chloride and correspondingly from about 25 to about 55%, preferably from about 35 to about 45% (e.g., 40%) by weight terephthaloyl chloride.

In preparing a preferred chlorinated aromatic polyester, the diacid halide will generally be utilized as an aromatic acid chloride mixture of from about 40 to about 90%, preferably from about 60 to about 80% (e.g., 70%) by weight isophthaloyl chloride, and correspondingly from about 10 to about 60%, preferably from about 20 to about 40% (e.g., 30%) by weight terephthaloyl chloride.

For smooth operation in a stirred solution, the resulting polymer product preferably should be about 10% or less on the basis of the total weight of the solvent although precentages as high as 25% may be utilized depending upon the molecular weight of the polymer.

Generally substantially stoichiometric amounts of each reactant are employed. Typical molar amounts of from about 1:0.9:0.1 to about 1:0.4:0.6, of the ratio of bisphenol, isophthaloyl chloride, and terephthaloyl chloride, respectively, may be utilized when preparing a chlorinated aromatic polyester. Typical molar amounts of from about 1:0.45:0.55 to about 1:0.75:0.25 of the ratio of bisphenol, isophthaloyl chloride, and terephthaloyl chloride, respectively, may also be utilized when preparing a brominated aromatic polyester.

The present invention may be carried out in a batch, semi-continuous, or continuous manner, as desired. However, in a preferred embodiment of the present invention, the polymerization reaction may be carried out in a continuous manner, by which the reactants are continuously introduced into the reaction zone and the polymer product is continuously prepared and withdrawn. This may be achieved, for example, by utilizing a cylindrical tube, having static mixers as a reaction vessel. The bisphenol containing solution is passed through the tube while adding the diacid halide at various points along the longitudinal axis of the tube. Thus, the diacid halide is added in large amounts at the upstream portion of the tube and in gradually decreasing amounts at positions further downstream in the tube.

The final concentration of the polymer in solution is from about 3 to about 25, typically from about 5 to about 20, and preferably from about 7 to about 15 percent by weight of the total reaction mixture. At these concentrations, the solution viscosity will generally vary from about 1 to about 3000 poise, typically from about 5 to about 2000 poise, and preferably from about 10 to about 1000 poise.

Polymerization is effected at temperatures which may vary from about 0 to about 200, typically from about 10 to about 100, and preferably from about 15° to about 50° C., and at corresponding autogenous pressures which are due to the vapor pressure of the solvent at the aforenoted temperatures which may vary from about 0.2 to about 26, typically from about 0.3 to about 4.8, and preferably from about 0.4 to about 1.4, atmospheres.

Agitation of the reactants should be sufficient to evenly disperse the diacid halide throughout the bisphenol containing solution to avoid a build-up of the concentration of the diacid halide in a localized area within the reaction mixture. Such agitation may be supplied by any of the standard means of mixing such as by stirrer, shaker, static mixer, spray nozzle or other flow agitating systems.

The present process typically employs reaction times of generally from about 0.1 to about 20, typically from about 1 to about 10, and preferably from about 2 to about 6, hours when conducted on a batch basis. Polymerization conducted on a continuous basis will typically employ shorter polymerization times depending on the degree of mixing.

After polymerization the polymer may be recovered by admixing with the polymer containing solution gaseous, substantially anhydrous, hydrogen chloride to neutralize the excess acid acceptor. The amount of gaseous, substantially anhydrous, hydrogen chloride added to the polymer containing solution should be sufficient to completely neutralize the excess, uncombined tertiary amine and thus is dependent upon the amount of excess tertiary amine initially added. This gaseous hydrogen chloride may be added to the polymer containing solution by any means known to those skilled in this art. For example, the gaseous hydrogen chloride may be added using a gas sparge.

Reaction of the hydrogen chloride with the tertiary amine takes place substantially immediately (i.e., as soon as the hydrogen chloride gas is dissolved in the polymer containing solution). This rapid neutralization of the tertiary amine is commercially advantageous since prior art neutralization methods, which involve the addition of aqueous hydrochloric acid, require much longer neutralization times because of the existence of a two-phase system.

This prior art method of neutralization by employing an aqueous hydrochloric acid solution requires four sequential aqueous hydrochloric acid washes in order to substantially remove the excess tertiary amine. Each of these hydrochloric acid washes involves agitation of the reaction mixture, settling of the solids, and decantation of the liquid. Furthermore, three or more water washes are needed to achieve a pH of 6. Using this aqueous hydrochloric acid solution approach of the prior art, the time required for neutralization may not be reduced below a certain minimum amount since a certain minimum amount of time is needed for contact of the aqueous phase with the organic phase and for transfer of excess tertiary amine to the interface of the two phases followed by reaction with the hydrogen chloride.

To some extent, the long neutralization times of the prior art aqueous methods may be shortened by adding a large excess of hydrogen chloride, but the addition of a large excess of hydrogen chloride is disadvantageous because (1) it introduces further impurities (i.e., the excess hydrogen chloride) into the polymer containing solvent, and (2) the addition of more aqueous hydrochloric acid further dilutes the tertiary amine hydrochloride product and renders this product more difficult to recover.

Besides the time advantages resulting from the use of gaseous, substantially anhydrous, hydrogen chloride instead of an aqueous solution of hydrochloric acid, there is the further advantage that much smaller amounts of hydrogen chloride may be introduced into the reaction system when the anhydrous method is employed since hydrogen chloride is soluble in the reaction medium and forms a homogeneous solution. Thus, there is less waste of hydrogen chloride as well as the reduction of potential environmental pollution.

The hydrogen chloride used in the process of the present invention is substantially anhydrous. Small amounts of water may be introduced into the system but, to the extent water is introduced, one encounters the various problems described hereinabove.

After the neutralization of the tertiary amine, the tertiary amine hydrochloride must be removed from the polymer containing solution. This may be accomplished by multiple batch extractions with water or preferably, by employing the continuous countercurrent extraction method disclosed in copending patent application U.S. Ser. No. 208,201, entitled "Continuous Countercurrent Extraction Process For Removing Water Soluble Impurities From Water Immiscible Solutions", filed concurrently herewith by Albert G. Williams. The disclosure of this patent application is hereby incorporated by reference.

After removal of the water-soluble impurities, the halogenated aromatic polyester may be recovered in any suitable manner such as evaporation of the solvent or by precipitation of the polymer in a suitable non-solvent such as acetone or methanol. The polymer may then be isolated in solid form and dissolved in a suitable solvent at a concentration sufficient to achieve the desired spinning dope viscosity or concentrated without isolation to the desired spinning dope viscosity by employing the method disclosed in copending patent application U.S. Ser. No. 208,202, entitled "Flash Evaporation Process for Concentrating Polymer Solutions", filed concurrently herewith by Albert G. Williams, and thereafter processed for shaping. The disclosure of this patent application is hereby incorporated by reference.

The halogenated aromatic polyesters prepared by the process of the presently claimed invention may be dissolved in a suitable spinning or casting solvent, such as methylene chloride or tetrahydrofuran and formed into a shaped article, such as a fiber or film.

The inherent viscosity of the polymer is determined by measuring the relative viscosity of a 0.1% solution of the polymer at 25° C. in a suitable solvent, such as chloroform or a 10/7 (w/w) mixture of phenol/trichlorophenol. The viscosity of the polymer solution is measured relative to the solvent alone and the inherent viscosity (I.V.) is determined from the following equation:

$$I.V. = \ln(V_2/V_1)/C$$

In the above formula, $V_2$ is the efflux time of the solution, $V_1$ is the efflux time of the solvent, and C is the concentration expressed in grams of polymer per hundred milliliters of solution.

The polymers of the present invention have inherent viscosity (I.V.) limits which may vary from about 0.4 to about 1.7, typically from about 0.6 to about 1.5, and preferably from about 0.7 to about 1.2 deciliters per gram which are indicative of polymers having a weight average molecular weight of from about 25,000 to about 150,000, typically from about 40,000 to about 123,000, and preferably from about 50,000 to about 97,000.

The halogenated aromatic polyesters described herein have been used to produce a number of inherently non-burning fibrous materials which are particularly advantageous when fibrous articles are required for use in fire-control environments, such as children's sleepwear, suits for fire fighters, hospital furnishings, and uniforms for military and civilian personnel.

The following Example is given as a specific illustration of the claimed invention. It should be understood, however, that the invention is not limited to the specific details set forth in this Example. All parts and percentages in the Example as well as in the remainder of the specification are by weight unless otherwise specified.

EXAMPLE

Two hundred one and seven-tenths parts by weight tetrabromobisphenol A, 45.2 parts by weight isophthaloyl chloride and 30.1 parts by weight terephthaloyl chloride are reacted to form a brominated aromatic polyester in the presence of about 2600 parts by weight methylene chloride solvent and 77.3 parts by weight triethylamine acid acceptor.

The content of the reaction zone are heated at atmospheric pressure at about 40° C. with agitation for 3 hours.

When the reaction is complete, substantially anhydrous hydrogen chloride is bubbled through a gas sparge into the solution for five minutes until the excess triethylamine is neutralized as determined by measuring the pH of the solution. The excess triethylamine is neutralized when the pH is reduced to below about 3.0. The pH is measured by determining the pH of the water layer of a mixture which is prepared by mixing 50% by weight reaction solution with 50% by weight distilled water. About 0.86 parts by weight of gaseous hydrogen chloride are required to effect neutralization of the excess triethylamine.

The reaction mixture is then washed with water until a pH of 6 is achieved. The resulting brominated polyester is recovered by precipitation with methanol.

The brominated aromatic polyester has the appearance of a white, fibrous flake and possesses the structural formula heretofore illustrated where X and Y are bromine groups, R and R' methyl groups, and n is about 50. The brominated aromatic polyester has a bromine content of about 48 percent by weight, a melting point of about 265° C., and an inherent viscosity of about 0.75 deciliters per gram measured at a concentration of 0.1 percent by weight in a solvent which is a mixture of 10 parts by weight of phenol and 7 parts by weight trichlorophenol.

COMPARATIVE EXAMPLE

The same amounts of reactants are reacted as in Example I but the neutralization is carried out using 880 part by weight of a 2.11% by weight aqueous hydrochloric acid solution. The mixture is agitated thoroughly for 30 minutes and then allowed to settle for 20 minutes. The aqueous layer is then decanted. The residual polymer containing mixture is washed in the same manner three more times using 680 parts by weight of a 0.55% by weight aqueous hydrochloric acid solution each time.

This neutralization step requires a minimum of five hours and introduces an excess of 2870 parts by weight of water and an excess of 28.9 parts by weight hydrogen chloride into the system.

The above Example and Comparative Example indicate the advantages associated with the neutralization of a tertiary amine using substantially anhydrous hydrogen chloride gas over the use of an aqueous solution of hydrochloric acid. If an aqueous solution of hydrochloric acid is used, then a large excess of hydrochloric acid as in the Comparative Example must be employed. Furthermore, in the Comparative Example, large amounts of water and hydrogen chloride are added to the system. These large amounts of water and hydrogen chloride must be removed during by-product (i.e., the reaction product of hydrogen chloride and triethylamine) recovery. By-product recovery is necessary in order to render the process economically feasible and to prevent pollution of the environment. Finally, the process illustrated by the Example is advantageous because it lends itself to a continuous process for producing the halogenated aromatic polyesters whereas the process described in the Comparative Example lends itself to a batch process.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

I claim:

1. A process for producing a halogenated aromatic polyester which comprises
   (a) reacting in solution in the presence of an excess amount of a tertiary amine
      (1) a bisphenol having the structural formula

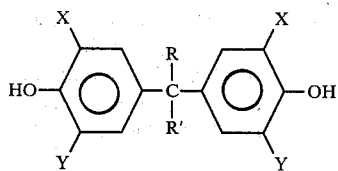

wherein X is chlorine or bromine and Y is hydrogen, chlorine or bromine, with the provision that when X is chlorine, Y is hydrogen or chlorine and when X is bromine, Y is hydrogen or bromine, R and R' may be the same or different and represent hydrogen, lower alkyl groups, or together constitute a cyclic hydrocarbon group, with
      (2) an aromatic acid halide selected from the group consisting of terephthaloyl halide, isophthaloyl halide, and mixtures thereof
   to form a reaction mixture comprising solvent, tertiary amine hydrochloride, unreacted tertiary amine, and a halogenated aromatic polyester having the recurring structural formula:

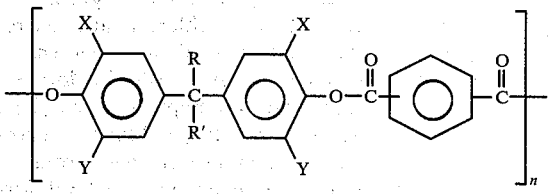

wherein X, Y, R and R' have the same meanings as above and n is an integer which is at least about 10,
   (b) adding to said reaction mixture an amount of gaseous substantially anhydrous hydrogen chloride sufficient to substantially completely neutralize the unreacted tertiary amine, and
   (c) recovering the halogenated aromatic polyester.

2. The process of claim 1 wherein X is a bromine group, R and R' are methyl groups, and n is about 50.

3. The process of claim 2 wherein the brominated aromatic polyester has a bromine content of about 25 to about 50 percent by weight, a melting point of about 265° C., and an inherent viscosity of about 0.6 to about 1.5 deciliters per gram determined at a concentration of 0.1 percent by weight in a solvent which is a mixture of 10 parts by weight phenol and 7 parts by weight trichlorophenol.

4. The process of claim 1 wherein the solvent is methylene chloride and the tertiary amine is triethylamine.

5. The process of claim 4 wherein the amount of excess amine is less than about 5 percent by weight based upon the stoichiometric amount of acid acceptor required.

6. The process of claim 2 wherein the aromatic acid halide is a mixture of from about 45 to about 75 percent by weight isophthaloyl chloride and correspondingly from about 55 to about 25 percent by weight terephthaloyl chloride.

7. The process of claim 1 wherein x is chlorine, and the aromatic acid halide is a mixture of from about 40 to about 90 percent by weight isophthaloyl chloride and correspondingly from about 60 to about 10 percent by weight terephthaloyl chloride.

8. The process of claim 1 wherein the final concentration of the polymer product in solution is from about 3 to about 20 percent by weight of the reaction mixture.

9. The process of claim 1 wherein said reaction is carried out at temperatures of from about 0° to about 200° C. and at pressures of from about 0.2 to about 26 atmospheres.

10. A process for producing a brominated aromatic polyester which comprises
   (a) reacting in methylene chloride in the presence of an excess amount of triethyl amine
      (1) a bisphenol having the structural formula:

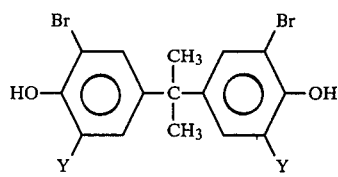

wherein Y is hydrogen or bromine, with
      (2) an aromatic acid mixture of terephthaloyl chloride and isophthaloyl chloride wherein from about 25 to about 55 percent by weight of the mixture is terephthaloyl chloride and correspondingly from about 75 to about 45 percent by weight of the mixture is isophthaloyl chloride
   to form a reaction mixture comprising methylene chloride, triethylamine hydrochloride, unreacted triethylamine, and a brominated aromatic polyester having the recurring structural formula:

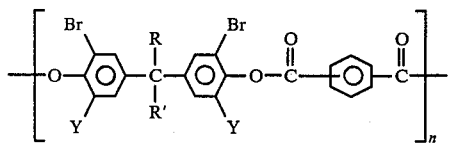

wherein Y has the same meaning as above and n is an integer which is at least about 10,
   (b) adding to said reaction mixture an amount of gaseous substantially anhydrous hydrogen chloride sufficient to substantially completely neutralize the unreacted triethylamine, and
   (c) recovering the brominated aromatic polyester.

11. The process of claim 10 wherein R and R' may contain from 1 to about 5 carbon atoms and wherein n may be from about 40 to about 400.

12. The process of claim 11 wherein said halogenated aromatic polyester is the condensation product of tetrabromobisphenol A and an aromatic diacid chloride mixture of from about 45 to about 75 percent by weight isophthaloyl chloride and correspondingly from about 55 to about 25 percent by weight terephthaloyl chloride.

13. The process of claim 12 wherein the aromatic diacid chloride mixture comprises 60 percent by weight isophthaloyl chloride and 40 percent by weight terephthaloyl chloride.

14. A process for producing a chlorinated aromatic polyester which comprises
   (a) reacting in methylene chloride in the presence of an excess amount of triethyl amine
      (1) a bisphenol having the structural formula:

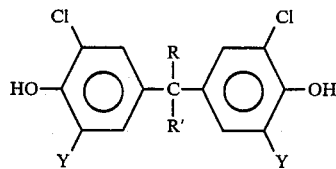

wherein Y is hydrogen or chlorine, with
      (2) an aromatic acid mixture of terephthaloyl chloride and isophthaloyl chloride wherein from about 10 to about 60 percent by weight of the mixture is terephthaloyl chloride and correspondingly from about 90 to about 40 percent by weight of the mixture is isophthaloyl chloride
   to form a reaction mixture comprising methylene chloride, triethylamine hydrochloride, unreacted triethylamine, and a chlorinated aromatic polyester having the recurring structural formula

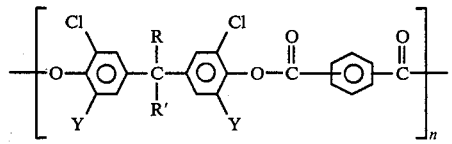

wherein Y has the same meaning as above and n is an integer which is at least about 50,
   (b) adding to said reaction mixture an amount of gaseous, substantially anhydrous, hydrogen chloride sufficient to substantially completely neutralize the unreacted triethylamine, and
   (c) recovering the chlorinated aromatic polyester.

* * * * *